United States Patent
Lee et al.

(10) Patent No.: US 9,116,557 B2
(45) Date of Patent: Aug. 25, 2015

(54) APPARATUS AND METHOD FOR SUPPORTING ERASER FUNCTION OF DIGITIZER PEN IN DIGITIZER SYSTEM

(75) Inventors: Jong-Min Lee, Incheon (KR);
Chul-Hwan Lee, Seoul (KR); Gi-Tae Mun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 289 days.

(21) Appl. No.: 13/236,944

(22) Filed: Sep. 20, 2011

(65) Prior Publication Data
US 2012/0293425 A1  Nov. 22, 2012

(30) Foreign Application Priority Data
May 16, 2011 (KR) .................. 10-2011-0045488

(51) Int. Cl.
*G06F 3/041* (2006.01)
*G06F 3/0354* (2013.01)
*G06F 3/0488* (2013.01)
*G06F 3/044* (2006.01)

(52) U.S. Cl.
CPC .......... *G06F 3/03545* (2013.01); *G06F 3/0488* (2013.01); *G06F 3/044* (2013.01); *G06F 3/04883* (2013.01)

(58) Field of Classification Search
USPC .................................. 345/174–174
See application file for complete search history.

(56) References Cited

U.S. PATENT DOCUMENTS

| 4,633,436 | A  | * | 12/1986 | Flurry ............................ 345/179 |
|---|---|---|---|---|
| 4,697,050 | A  | * | 9/1987  | Farel et al. .................. 178/19.07 |
| 5,475,401 | A  |   | 12/1995 | Verrier et al. |
| 6,160,539 | A  |   | 12/2000 | Fleck |
| 6,689,965 | B1 | * | 2/2004  | Fleck .......................... 178/18.01 |
| 2004/0140964 | A1 | * | 7/2004 | Wang et al. .................... 345/179 |
| 2004/0252091 | A1 | * | 12/2004 | Ma et al. .......................... 345/87 |
| 2007/0176904 | A1 | * | 8/2007 | Russo ............................ 345/173 |
| 2009/0078476 | A1 | * | 3/2009 | Rimon et al. ............... 178/18.03 |
| 2010/0051356 | A1 | * | 3/2010 | Stern et al. ................. 178/19.04 |
| 2010/0182284 | A1 | * | 7/2010 | Tremblay ..................... 345/179 |
| 2011/0169775 | A1 | * | 7/2011 | Liaw et al. .................... 345/175 |

FOREIGN PATENT DOCUMENTS

| EP | 0 622 753 | A2 | 11/1994 |
|---|---|---|---|
| EP | 0 964 327 | A2 | 12/1999 |

\* cited by examiner

*Primary Examiner* — Kent Chang
*Assistant Examiner* — Nathan Brittingham
(74) *Attorney, Agent, or Firm* — Cha & Reiter, LLC

(57) ABSTRACT

An apparatus and method for supporting an eraser function of a digitizer pen in a digitizer system are provided. The method includes, if it is recognized that an eraser part of the digitizer pen gets contact on a reception device, determining a pressure of the eraser part contacting on a surface of the reception device and, according to the determined pressure, changing a frequency transmitted to the reception device.

18 Claims, 11 Drawing Sheets

APPARATUS AND METHOD FOR SUPPORTING ERASER FUNCTION OF DIGITIZER PEN IN DIGITIZER SYSTEM

CLAIM OF PRIORITY

This application claims priority under 35 U.S.C. §119(a) to a Korean Patent Application filed in the Korean Intellectual Property Office on May 16, 2011 and assigned Serial No. 10-2011-0045488, the contents of which are herein incorporated by reference.

BACKGROUND OF THE INVENTION

1. Field of the Invention

The present invention relates to an eraser function of a digitizer pen. More particularly, the present invention relates to an apparatus and method for adjusting, in real-time, an erasure region size of an eraser part of a digitizer pen in a digitizer system.

2. Description of the Related Art

In a mobile device such as a tablet computer, a Personal Digital Assistant (PDA), a smart phone and the like, digitizer pens are being used to input information via a display screen. Using a digitizer pen, a user can input or delete desired content on the display screen of a mobile device.

The digitizer pen can be composed of a pen part and an eraser part. However, the eraser part of the existing digitizer pen can only simply delete as much content according to a preset basic erasure region size, and thus cannot adjust the size of the erasure region during operation. So, there is an inconvenience in using the eraser part of the digitizer pen.

SUMMARY OF THE INVENTION

An aspect of the present invention is to substantially solve at least the above problems and/or disadvantages and to provide at least the advantages below. Accordingly, one aspect of the present invention is to provide an apparatus and method for supporting an eraser function of a digitizer pen in a digitizer system.

Another aspect of the present invention is to provide an apparatus and method for adjusting, in real-time, an erasure region size of an eraser part of a digitizer pen in a digitizer system during operation.

A further aspect of the present invention is to provide an apparatus and method for determining an erasure region size according to a pressure of an eraser part of a digitizer pen in a digitizer system.

Yet another aspect of the present invention is to provide an apparatus and method for determining an erasure region size according to a contact area of an eraser part of a digitizer pen in a digitizer system.

Still another aspect of the present invention is to provide an apparatus and method for displaying a popup window including a list of erasure region sizes and receiving a selection of the erasure region size in a digitizer system.

In one embodiment, an operation method of a digitizer pen for supporting an eraser function of the digitizer pen in a digitizer system includes, if is recognized that an eraser part of the digitizer pen makes a contact on a surface of a reception device, determining a pressure by the eraser part applied on the surface of the reception device, and then determining a frequency indicative of the determined pressure for a subsequent transmission to the reception device.

In another embodiment, an operation method of a reception device for supporting an eraser function of a digitizer pen in a digitizer system includes, based on a frequency received from the digitizer pen, determining a pressure by an eraser part of the digitizer pen applied on a surface of the reception device and, adjusting, in real-time, an erasure region size of the eraser part corresponding to the determined pressure value of the eraser part.

In another embodiment, an operation method of a digitizer pen for supporting an eraser function of the digitizer pen in a digitizer system includes, if it is recognized that an eraser part of the digitizer pen makes a contact on a reception device, determining a contact area by the eraser part applied on a surface of the reception device and determining a frequency corresponding to the determined contact area for a subsequent transmission to the reception device.

In another embodiment, an operation method of a reception device for supporting an eraser function of a digitizer pen in a digitizer system includes, based on a frequency received from the digitizer pen, determining a contact area by an eraser part of the digitizer pen applied on a surface of the reception device and adjusting, in real-time, an erasure region size corresponding to the determined contact area.

In another embodiment, an operation method of a reception device for supporting an eraser function of a digitizer pen in a digitizer system includes, based on a frequency received from the digitizer pen, determining if the received frequency corresponds to a frequency range for recognizing a contact by an eraser part of the digitizer pen applied on a surface of the reception device, when the received frequency corresponds to the frequency range for recognizing the contact of the eraser part, displaying a list of erasure region sizes through a popup window on a screen and, when one erasure region size is selected from the list of erasure region sizes displayed through the popup window, determining the selected size as an erasure region size of the eraser part.

In another embodiment, a digitizer pen for supporting an eraser function of the digitizer pen in a digitizer system includes an acceleration sensor for, if it is recognized that an eraser part of the digitizer pen gets contact on a reception device, determining a contact area by the eraser part applied on a surface of the reception device; and a frequency determiner for determining a frequency corresponding to the determined contact area for a subsequent transmission to the reception device.

In another embodiment, a reception device for supporting an eraser function of a digitizer pen in a digitizer system includes an erasure region size determiner for, based on a frequency received from the digitizer pen, determining a contact area by an eraser part of the digitizer pen applied on a surface of the reception device and adjusting, in real-time, an erasure region size of the eraser part according to the determined contact area.

In another embodiment, a reception device for supporting an eraser function of a digitizer pen in a digitizer system includes an erasure region size determiner for, based on a frequency received from the digitizer pen, determining if the received frequency corresponds to a frequency range for recognizing a contact by an eraser part of the digitizer pen applied on a surface of the reception device and, when the received frequency corresponds to the frequency range for recognizing the contact of the eraser part, displaying a list of erasure region sizes through a popup window on a screen and, when one erasure region size is selected from the list of erasure region sizes displayed through the popup window, determining the selected size as an erasure region size of the eraser part is provided.

BRIEF DESCRIPTION OF THE DRAWINGS

The above features and advantages of the present invention will become more apparent from the following detailed description when taken in conjunction with the accompanying drawings in which.

DETAILED DESCRIPTION

Hereinafter, preferred embodiments of the present invention will be described herein below with reference to the accompanying drawings. For the purposes of clarity and simplicity, well-known functions or constructions are not described in detail as they would obscure the invention in unnecessary detail. Further, terms described below, which are defined considering functions in the present invention, can be different depending on user and operator's intention or practice. Therefore, the terms should be defined on the basis of the disclosure throughout this specification.

Below, exemplary embodiments of the present invention provide a way for supporting an eraser function of a digitizer pen in a digitizer system. Particularly, exemplary embodiments of the present invention provide a way for real-time adjusting a size of an erasure region of a digitizer pen in a digitizer system.

Figure 1:
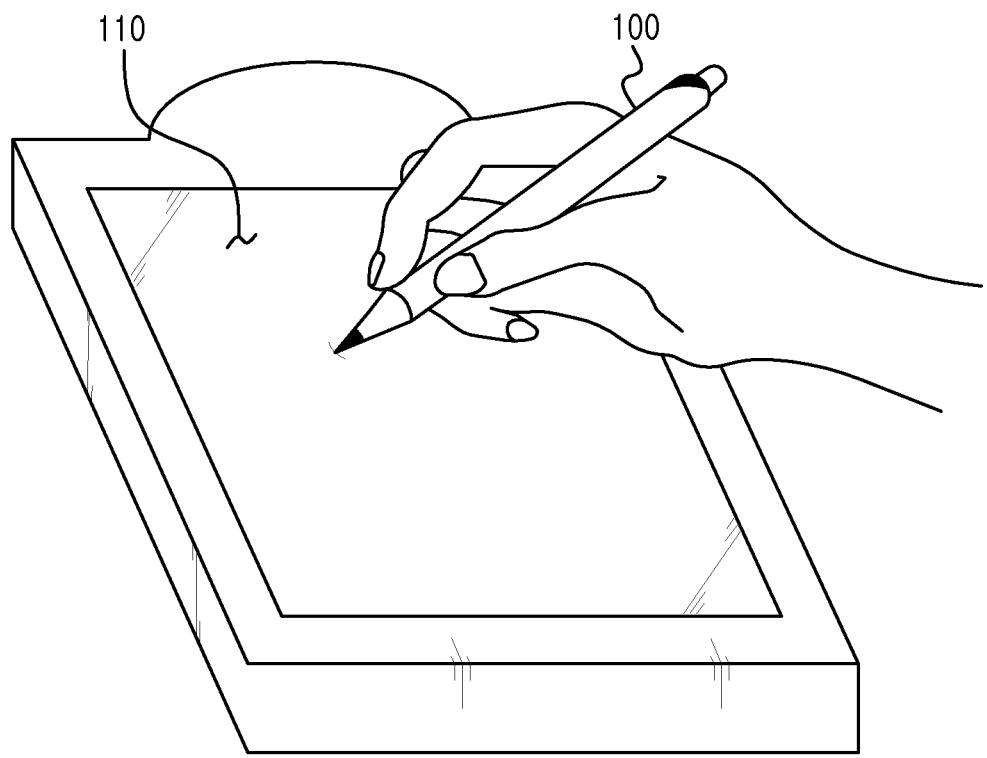
FIG. 1 is a diagram illustrating a construction of a digitizer system according to the present invention.

FIG. 1 is a diagram illustrating a construction of a digitizer system according to the present invention.

Referring to FIG. 1, the digitizer system includes a digitizer pen 100 and a reception device 110.

The digitizer pen 100 is divided into a pen portion and an eraser portion at both ends, respectively. The eraser part is, for example, formed of rubber materials in an oblique structure so that a user can intuitively recognize a thin eraser and a thick eraser.

The reception device 110 recognizes a motion/writing/erasure of the digitizer pen 100 contact activated by a user on the reception device 110. According to the types of a reception device, the reception device 110 can have a display screen. In this case, the reception device 110 can display, on the display screen, a motion/writing/erasure of the digitizer pen 100 corresponding to the user's contact or motion of contact recognized on the reception device 110. In a case where the reception device 110 is equipped with no display screen, through a separate device (not shown) with a display screen wireless or wired connected with the reception device 110, the reception device 110 can display, on the display screen, a motion/writing/erasure of the digitizer pen 100 contact responsive to the user's hand motion on the reception device 110.

Figure 2:
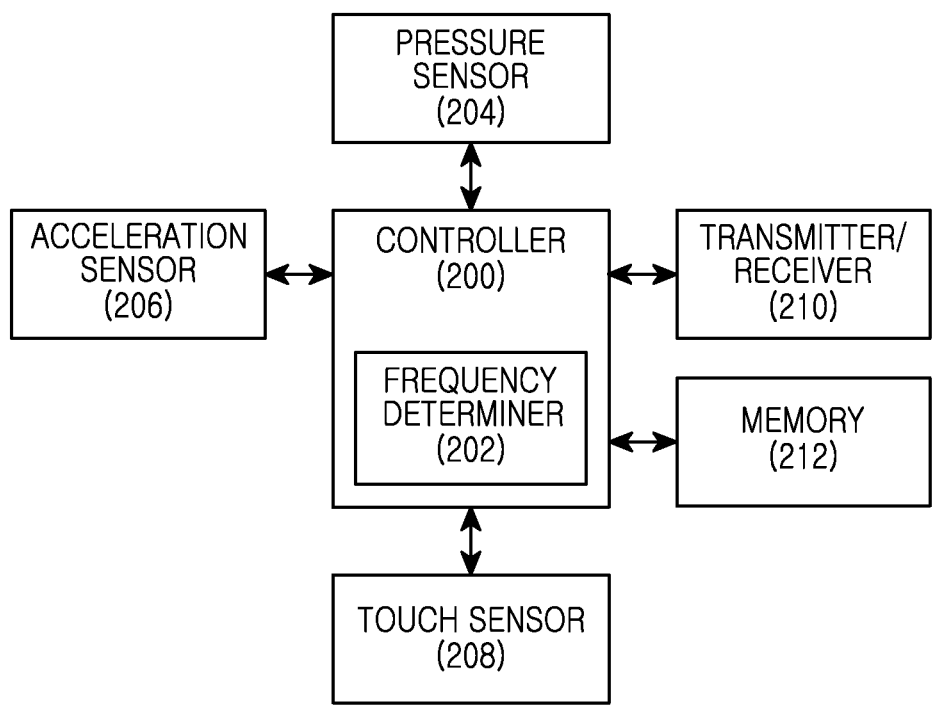
FIG. 2 is a block diagram illustrating a construction of a digitizer pen according to the present invention.

FIG. 2 is a block diagram illustrating a construction of a digitizer pen according to the present invention.

As illustrated in FIG. 2, the digitizer pen includes a controller 200, a pressure sensor 204, an acceleration sensor 206, a contact sensor 208, a transmitter/receiver 210, and a memory 212. The controller 200 includes a frequency determiner 202.

In operation, the controller 200 controls the general operation of the digitizer pen and includes the frequency determiner 202 and also controls and processes the overall general operation for adjusting, in real-time, the size of an erasure region size of the digitizer pen.

Particularly, according to a first exemplary embodiment of the present invention, if it is recognized that the eraser part gets contact on a reception device, the frequency determiner 202 determines an amount of contact pressure by the eraser part on the reception device and, then according to the determined pressure, changes a frequency transmitted to the reception device.

According to a second exemplary embodiment of the present invention, when the eraser part makes a contact on the reception device, the frequency determiner 202 determines a contact area of the eraser part on the reception device and, according to the determined contact area, changes a frequency transmitted to the reception device.

According to a third exemplary embodiment of the present invention, when the eraser part makes a contact on the reception device, the frequency determiner 202 transmits a frequency responsive to the recognized contact of the eraser part to the reception device.

According to the first exemplary embodiment of the present invention, the pressure sensor (or variable capacitor) 204 sensing the eraser part of the digitizer pen senses a contact pressure of the eraser part on the reception device.

According to the second exemplary embodiment of the present invention, the acceleration sensor 206 senses a contact area of the eraser part on the reception device.

The contact sensor 208 senses if the eraser part makes a contact on the reception device.

The transmitter/receiver 210 performs a function of signal (e.g., frequency) transmission/reception between the eraser part of the digitizer pen and the reception device, through a coil.

The memory 212 stores a pressure-frequency mapping table according to the first exemplary embodiment of the present invention, or stores a contact area-frequency mapping table according to the second exemplary embodiment of the present invention.

Figure 3:
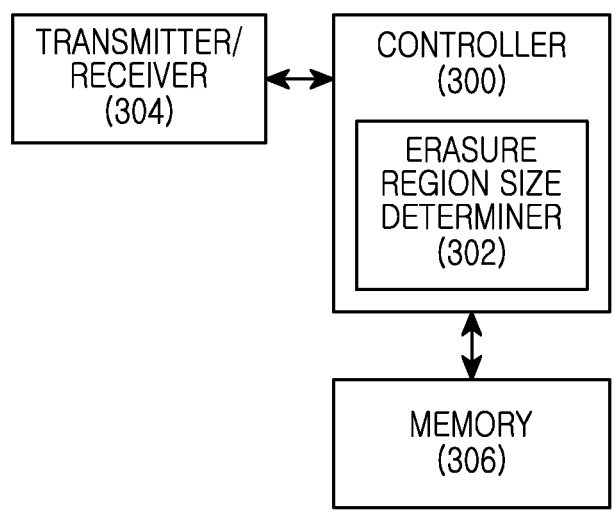
FIG. 3 is a block diagram illustrating a construction of a reception device according to the present invention.

FIG. 3 is a block diagram illustrating a construction of a reception device according to the present invention.

As shown in FIG. 3, the reception device includes a controller 300, a transmitter/receiver 304, and a memory 306. The controller 300 includes an erasure region size determiner 302.

In operation, the controller 300 controls the general operation of the reception device and includes the erasure region size determiner 302 and also controls and processes the general operation for adjusting, in real-time, the size of an erasure region of a digitizer pen.

Particularly, according to a first exemplary embodiment of the present invention, the erasure region size determiner 302 determines an amount of pressure of the eraser part when contacting the reception device via a frequency indicative of the pressure amount received from the digitizer pen and selectively adjusts an erasure region size of the eraser part according to the determined pressure value of the eraser part.

Alternatively, according to a second exemplary embodiment of the present invention, the erasure region size determiner 302 determines a contact area of the eraser part on the reception device via a frequency indicative of the determined contact area received from the digitizer pen and selectively adjusts an erasure region size of the eraser part according to the determined contact area of the eraser part.

Alternatively, according to a third exemplary embodiment of the present invention, if a contact of the eraser part of the digitizer pen is recognized, the erasure region size determiner 302 displays a list of erasure region sizes through a popup window in a void space around a contact recognized region and, according to the selection from the list of erasure region sizes, determines the selected size to change the size of an erasure region of the eraser part. In another embodiment, if a contact of an eraser part of a digitizer pen is recognized, the erasure region size determiner 302 can forward a coordinate of a contact recognized region and a contact recognition indicator indicating that the contact is recognized in the corresponding coordinate, to a separate device. In this case, the separate device can display a list of erasure region sizes through a popup window in a void space around a contact recognized region and, according to is the selection from the list of erasure region sizes, as the size of an erasure region size is changed.

The transmitter/receiver 304 performs a function of signal (e.g., frequency) transmission/reception between the eraser part of the digitizer pen and the reception device.

According to a first exemplary embodiment of the present invention, the memory 306 stores a frequency-pressure mapping table and a pressure-erasure region size mapping table. Also, according to a second exemplary embodiment of the present invention, the memory 306 stores a frequency-contact area mapping table and a contact area-erasure region size mapping table. Also, according to a third exemplary embodiment of the present invention, the memory 306 may store a list of erasure region sizes.

Figure 4:
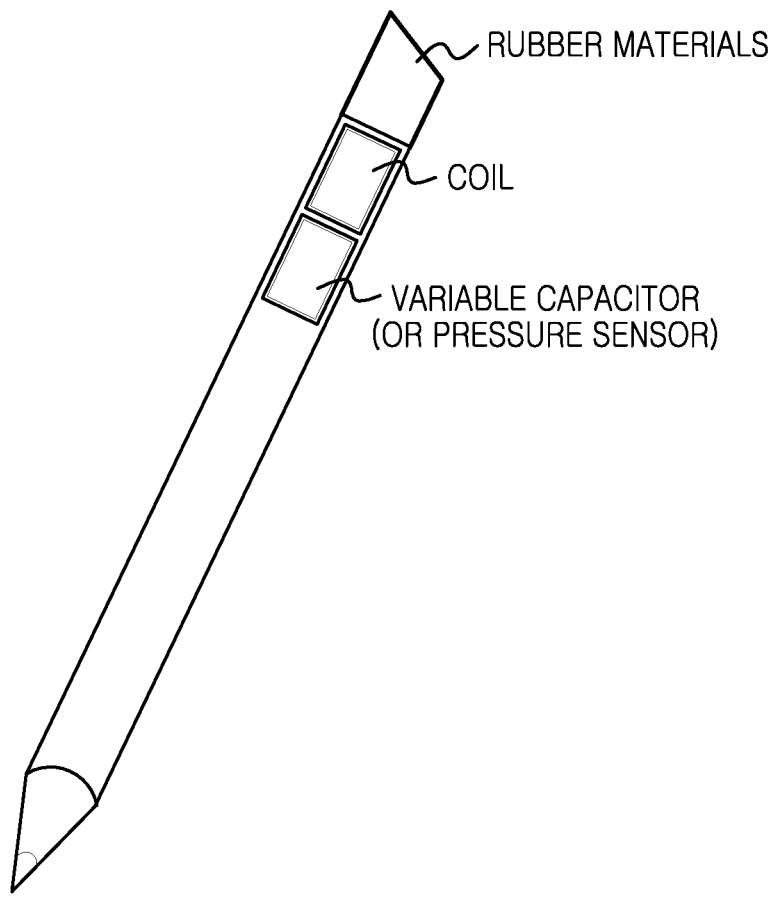
FIG. 4 is a diagram illustrates a digitizer pen according to a first exemplary embodiment of the present invention.

FIG. 4 is a diagram illustrating an example of a method for erasure region size determination dependent on a pressure of an eraser part in a digitizer pen according to a first exemplary embodiment of the present invention.

Referring to FIG. 4, the digitizer pen has a pen part and an eraser part at both ends, respectively. The eraser part connects with a coil and a variable capacitor (or pressure sensor). The coil performs a function of signal transmission/reception between the eraser part of the digitizer pen and a reception device. The variable capacitor (or pressure sensor) senses an amount of pressure by the eraser part applied on a surface of the reception device. The eraser part is, for example, formed of rubber materials in an oblique structure and is composed of an edge portion and a surface portion, thus allowing a user to intuitively recognize a thin eraser and a thick eraser.

If it is recognized that the eraser part gets contact on the reception device, the digitizer pen can determine the amount of pressure of the eraser part applied on the reception device using the pressure sensor (or variable capacitor) connected to the eraser part, then change a frequency transmitted to the reception device according to the determined pressure. Using the frequency received from the digitizer pen, the reception device can determine the amount of pressure exerted by the eraser part on the reception device, then adjust an erasure region size of the eraser part accordingly. A detailed description is made hereinafter with reference to FIGS. 5 and 6.

Figure 5:
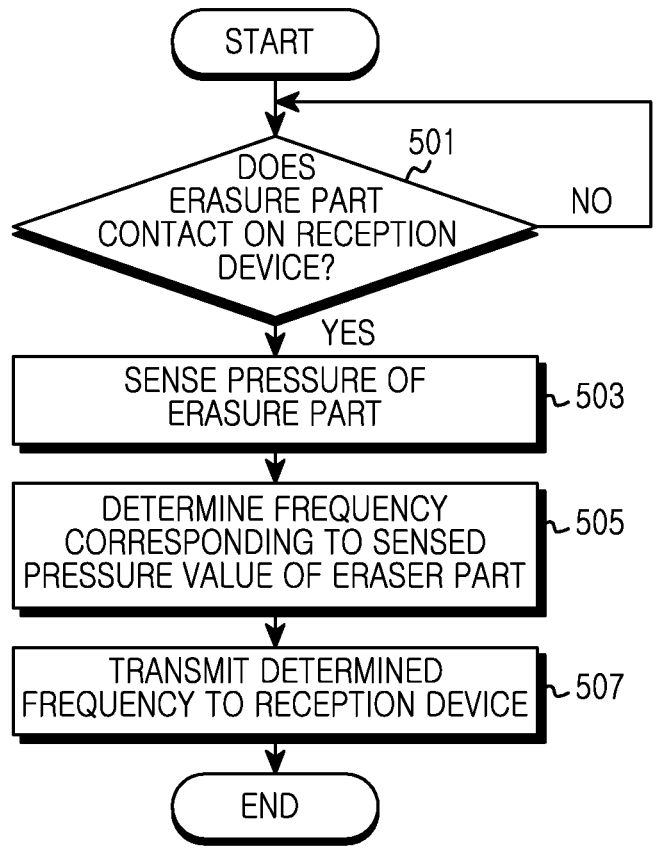
FIG. 5 is a flowchart illustrating an operation method of determining an erasure region size that is dependent on the pressure of an eraser part in a digitizer pen according to a first exemplary embodiment of the present invention.

FIG. 5 is a flowchart illustrating an operation method for erasure region size determination dependent on a pressure of an eraser part in a digitizer pen according to a first exemplary embodiment of the present invention.

Referring to FIG. 5, in step 501, the digitizer pen determines if an eraser part makes a contact on a reception device using a contact sensor.

If it is determined in step 501 that the eraser part gets contact on the reception device, in step 503, the digitizer pen senses a pressure of the eraser part applied on a surface of the reception device. For example, the digitizer pen can sense a pressure of the eraser part on the reception device during contact using a pressure sensor (or variable capacitor) connected to the eraser part.

In step 505, the digitizer pen determines a frequency corresponding to the sensed pressure value of the eraser part with reference to a pressure-frequency mapping table within a memory. For instance, assuming that a frequency range for recognizing that the eraser part on the reception device is 52 to 53 KHz and a frequency range for recognizing that the pen part on the reception device is 50 to 51 KHz, the lowest frequency of the frequency range 52 to 53 KHz can be mapped to the lowest pressure value, and the highest frequency can be mapped to the highest pressure value, for example. Alternatively, the highest frequency of the frequency range 52 to 53 KHz can be mapped to the lowest pressure value, and the lowest frequency can be mapped to the highest pressure value.

After determining the frequency from the look up table, in step 507, the digitizer pen transmits the determined frequency to the reception device.

Thereafter, the digitizer pen terminates the algorithm according to the present invention.

Figure 6:
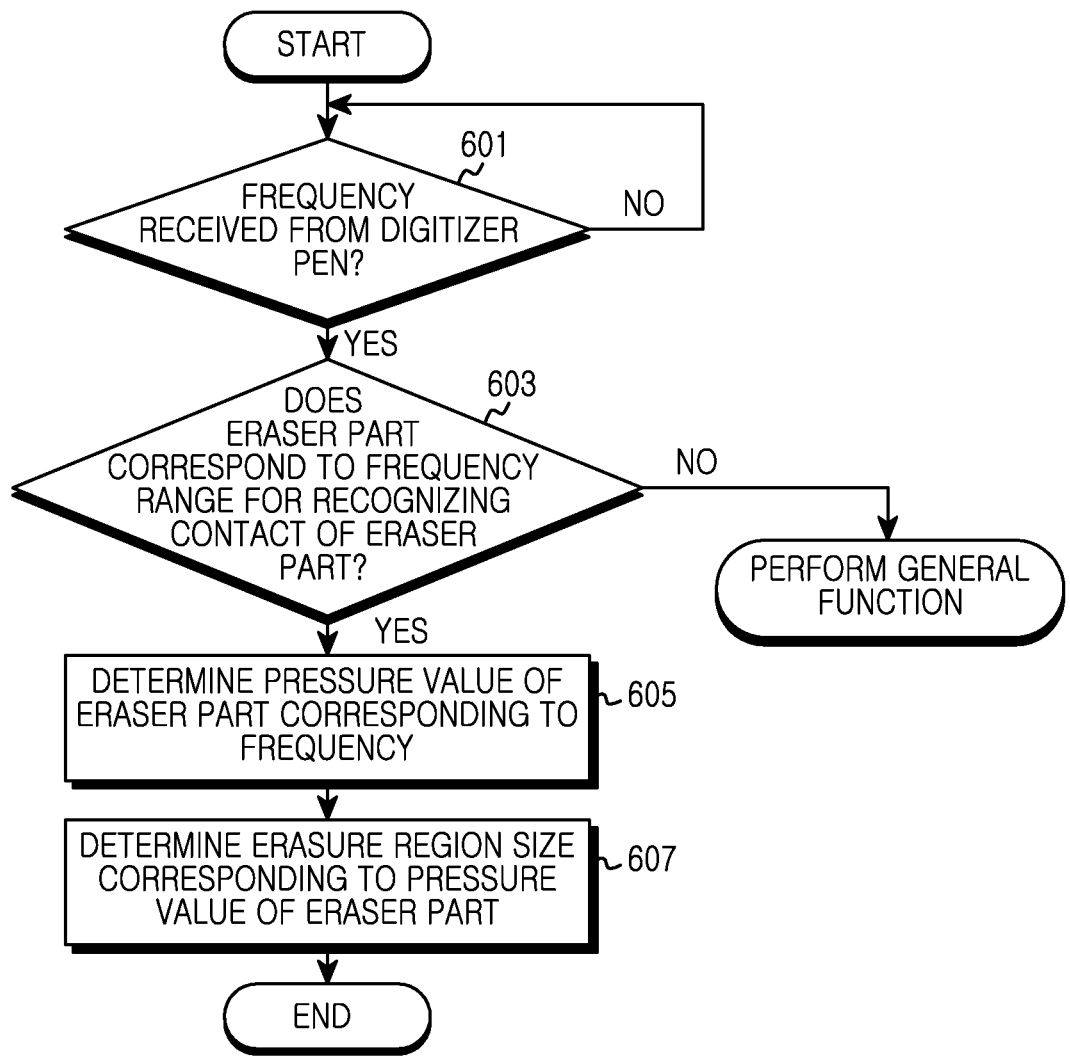
FIG. 6 is a flowchart illustrating an operation method of determining an erasure region size that is dependent on the pressure of an eraser part of a digitizer pen in a reception device according to a first exemplary embodiment of the present invention.

FIG. 6 is a flowchart illustrating an operation method for erasure region size determination dependent on a pressure of an eraser part of a digitizer pen in a reception device according to a first exemplary embodiment of the present invention.

Referring to FIG. 6, in step 601, the reception device determines if a frequency is received from a digitizer pen.

When it is determined in step 601 that the frequency indicative of the amount of pressure exerted during contact is received from the digitizer pen, in step 603, the reception device determines if the received frequency corresponds to a frequency range for recognizing a contact of an eraser part.

When it is determined in step 603 that the received frequency corresponds to the frequency range for recognizing the contact of the eraser part, in step 605, the reception device determines a pressure value of the eraser part corresponding to the frequency received from the digitizer pen with reference to a frequency-pressure mapping table within a memory.

In step 607, the reception device determines an erasure region size corresponding to the determined pressure value of the eraser part with reference to a pressure-erasure region size mapping table within the memory. For instance, the lowest pressure value can be mapped to the least erasure region size, and the highest pressure value can be mapped to the largest erasure region size. Alternatively, the lowest pressure value can be mapped to the largest erasure region size, and the highest pressure value can be mapped to the least erasure region size.

In contrast, when it is determined in step 603 that the received frequency does not correspond to the frequency range for recognizing the contact of the eraser part, the reception device determines that the received frequency corresponds to a frequency range for recognizing a contact of the pen part, and performs a general function according to the recognition of the contact of the pen part of the digitizer pen.

Thereafter, the reception device terminates the algorithm according to the present invention.

According to a second exemplary embodiment of the present invention, if it is recognized that an eraser part makes a contact on a reception device, a digitizer pen can determine an amount of contact area by the eraser part applied on a surface of the reception device using an acceleration sensor. Then, according to the determined contact area amount, a frequency indicative of the determined contact area amount transmitted to the reception device is changed. For example, as in FIG. 4, in a case where the eraser part is formed in an oblique structure, the digitizer pen can determine which one of an edge portion and a surface portion of the eraser part makes a contact on the reception device using the acceleration sensor and, accordingly, can determine a contact area of the eraser part on the reception device. Through a frequency indicative of the contacted area by the eraser part received from the digitizer pen, the reception device can determine a contact area of the eraser part on the reception device, then adjust, in real-time, an erasure region size of the eraser part according to the determined contact area of the eraser part. Hereinafter, a detailed description is made with reference to FIGS. 7 and 8.

Figure 7:
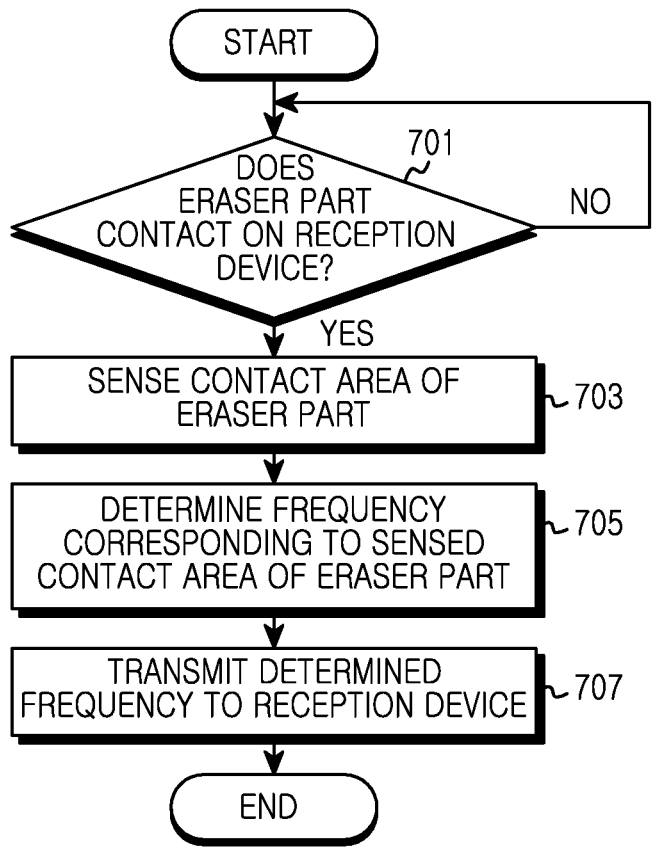
FIG. 7 is a flowchart illustrating an operation method of determining an erasure region size that is dependent on a contact area of an eraser part in a digitizer pen according to a second exemplary embodiment of the present invention.

FIG. 7 is a flowchart illustrating an operation method for determining an erasure region size based on a pressure of an eraser part in a digitizer pen according to a second exemplary embodiment of the present invention.

Referring to FIG. 7, in step 701, the digitizer pen determines if an eraser part makes a contact on a reception device using a contact sensor.

If so, in step 703, the digitizer pen senses a contact area of the eraser part keeping contact on the reception device. Here, the digitizer pen can sense a contact area of the eraser part on the reception device using an acceleration sensor.

In step 705, the digitizer pen determines a frequency corresponding to the sensed contact area of the eraser part with reference to a contact area-frequency mapping table within a memory. For instance, assuming that a frequency range for recognizing that the eraser part gets contact on the reception device is 52 to 53 KHz and a frequency range for recognizing that a pen part gets contact on the reception device is 50 to 51 KHz, the lowest frequency of the frequency range 52 to 53 KHz can be mapped to the least contact area, and the highest frequency can be mapped to the largest contact area. Or, the highest frequency of the frequency range 52 to 53 KHz can be mapped to the least contact area, and the lowest frequency can be mapped to the largest contact area.

In step 707, the digitizer pen transmits the determined frequency to the reception device.

Thereafter, the digitizer pen terminates the algorithm according to the present invention.

Figure 8:
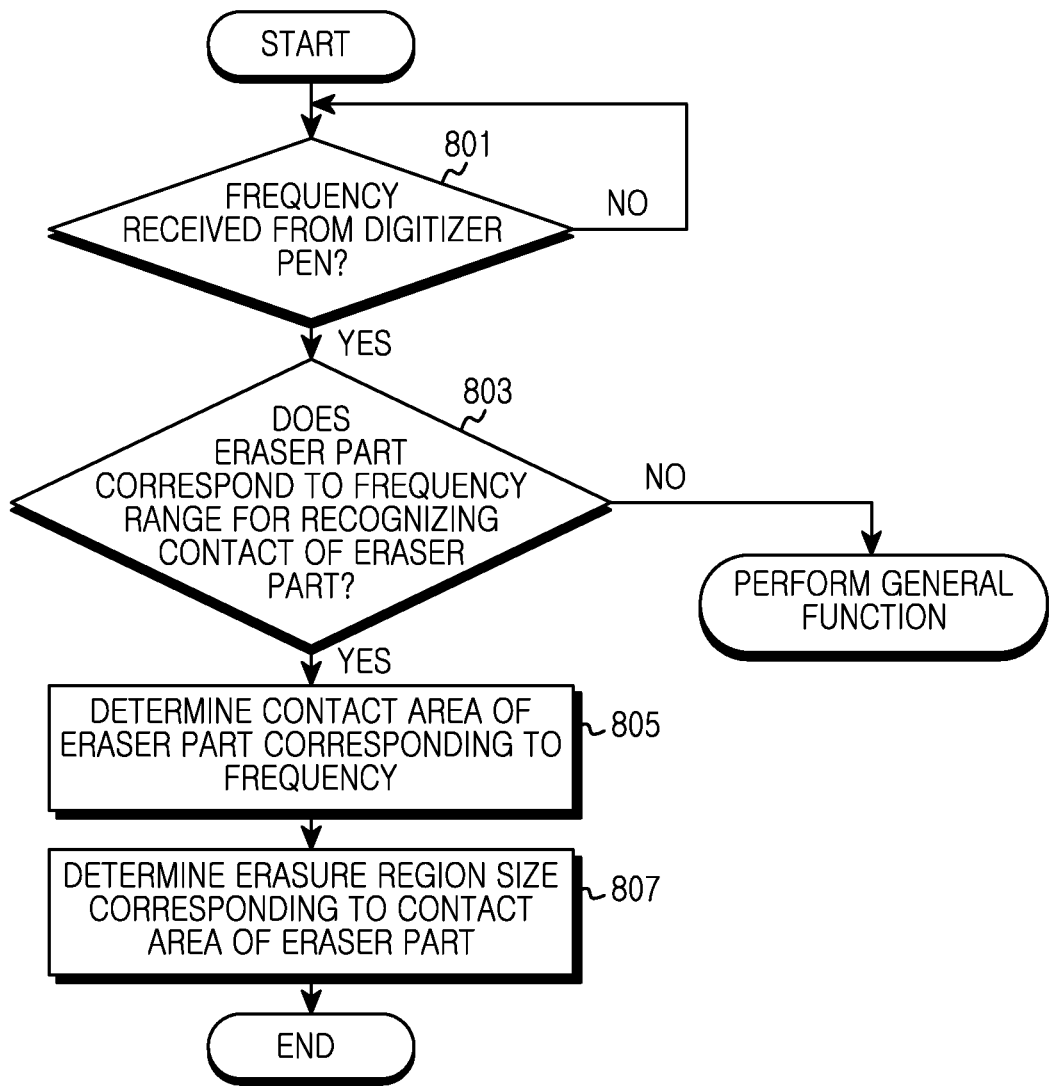
FIG. 8 is a flowchart illustrating an operation method of determining an erasure region size that is dependent on a contact area of an eraser part of a digitizer pen in a reception device according to a second exemplary embodiment of the present invention.

FIG. 8 is a flowchart illustrating an operation method for determining an erasure region size based on a pressure of an eraser part of a digitizer pen in a reception device according to a second exemplary embodiment of the present invention.

Referring to FIG. 8, in step 801, the reception device determines if a frequency is received from a digitizer pen.

If so, in step 803, the reception device determines if the received frequency corresponds to a frequency range for recognizing a contact of an eraser part.

When it is determined in step 803 that the received frequency corresponds to the frequency range for recognizing the contact of the eraser part, in step 805, the reception device determines a contact area of the eraser part corresponding to the frequency received from the digitizer pen with reference to a frequency-contact area mapping table within a memory.

In step 807, the reception device determines an erasure region size corresponding to the determined contact area of the eraser part with reference to a contact area-erasure region size mapping table within the memory. For instance, the least contact area can be mapped to the least erasure region size, and the largest contact area can be mapped to the largest erasure region size. Alternatively, the least contact area can be mapped to the largest erasure region size, and the largest contact area can be mapped to the least erasure region size.

In contrast, when it is determined in step 803 that the received frequency does not correspond to the frequency range for recognizing the contact of the eraser part, the reception device determines that the received frequency corresponds to a frequency range for recognizing a contact of the pen part, and performs a general function according to the recognition of the contact of the pen part of the digitizer pen.

Thereafter, the reception device terminates the algorithm according to the present invention.

Figure 9:
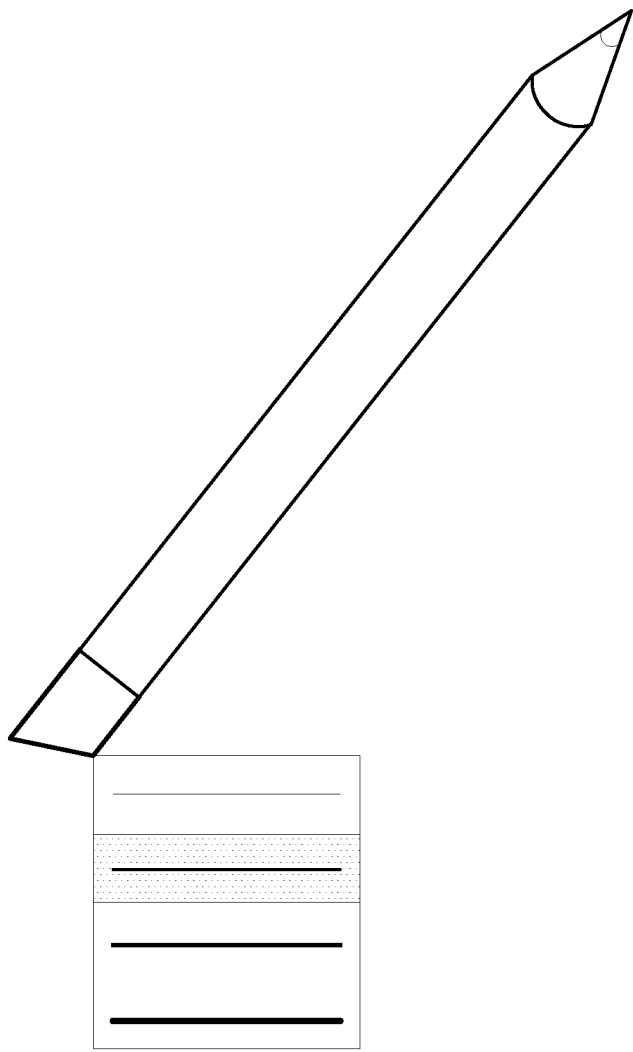
FIG. 9 is a diagram illustrating an operation method of determining an erasure region size that is dependent on a popup window display in a digitizer pen according to a third exemplary embodiment of the present invention.

FIG. 9 is a diagram illustrating an example of an operation method for determining an erasure region size based on popup window display in a digitizer pen according to a third exemplary embodiment of the present invention.

Referring to FIG. 9, if a contact of an eraser part of the digitizer pen is recognized, a reception device can display a list of erasure region sizes through a popup window in a void space around a contact recognized region and, according to this, if one erasure region size is selected from the list of erasure region sizes, determine the selected size as an erasure region size of the eraser part. A detailed description is made with reference to FIGS. 10 and 11.

In an alternate embodiment, if a contact of an eraser part of a digitizer pen is recognized, a reception device can forward a coordinate of a contact recognized region and a contact recognition indicator indicating that the contact is recognized in the corresponding coordinate, to a separate device. Here, the separate device has a display screen, and can wireless or wired connect with the reception device and display, on the display screen, a motion/writing/erasure of the digitizer pen contact recognized by a user on the reception device. In this case, the separate device can display a list of erasure region sizes through a popup window in a void space around a contact recognized region and, according to this, if one erasure region size is selected from the list of erasure region sizes, determine the selected size as an erasure region size of the eraser part.

Figure 10:
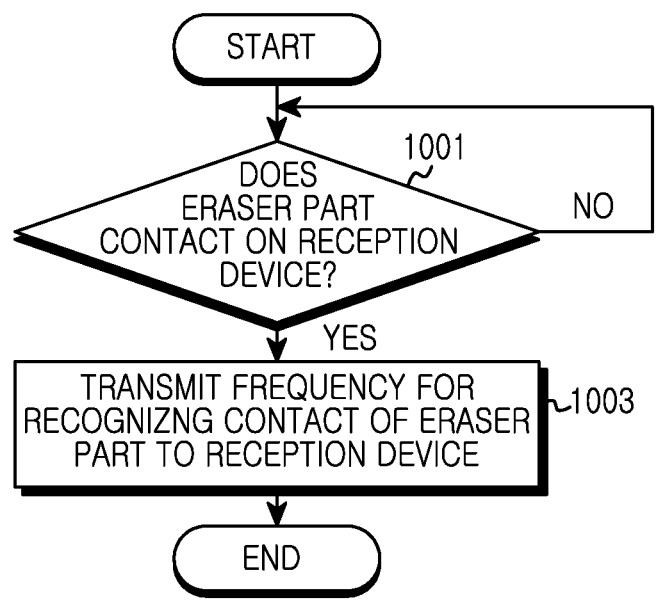
FIG. 10 is a flowchart illustrating an operation method of determining an erasure region size that is dependent on a popup window display in a digitizer pen according to a third exemplary embodiment of the present invention.

FIG. 10 is a flowchart illustrating an operation method for determining an erasure region size using a popup window display in a digitizer pen according to a third exemplary embodiment of the present invention.

Referring to FIG. 10, in step 1001, the digitizer pen determines if an eraser pen gets contact on a reception device using a contact sensor.

When it is determined in step 1001 that the eraser part gets contact on the reception device, in step 1003, the digitizer pen transmits a frequency for recognizing a contact of the eraser part to the reception device. For example, if a frequency for recognizing that the eraser part gets contact on the reception device is equal to 52 KHz, and a frequency for recognizing that a pen part gets contact on the reception device is equal to 50 KHz, the digitizer pen can transmit the frequency 52 KHz for recognizing the contact of the eraser part to the reception device.

After that, the digitizer pen terminates the algorithm according to the present invention.

Figure 11:
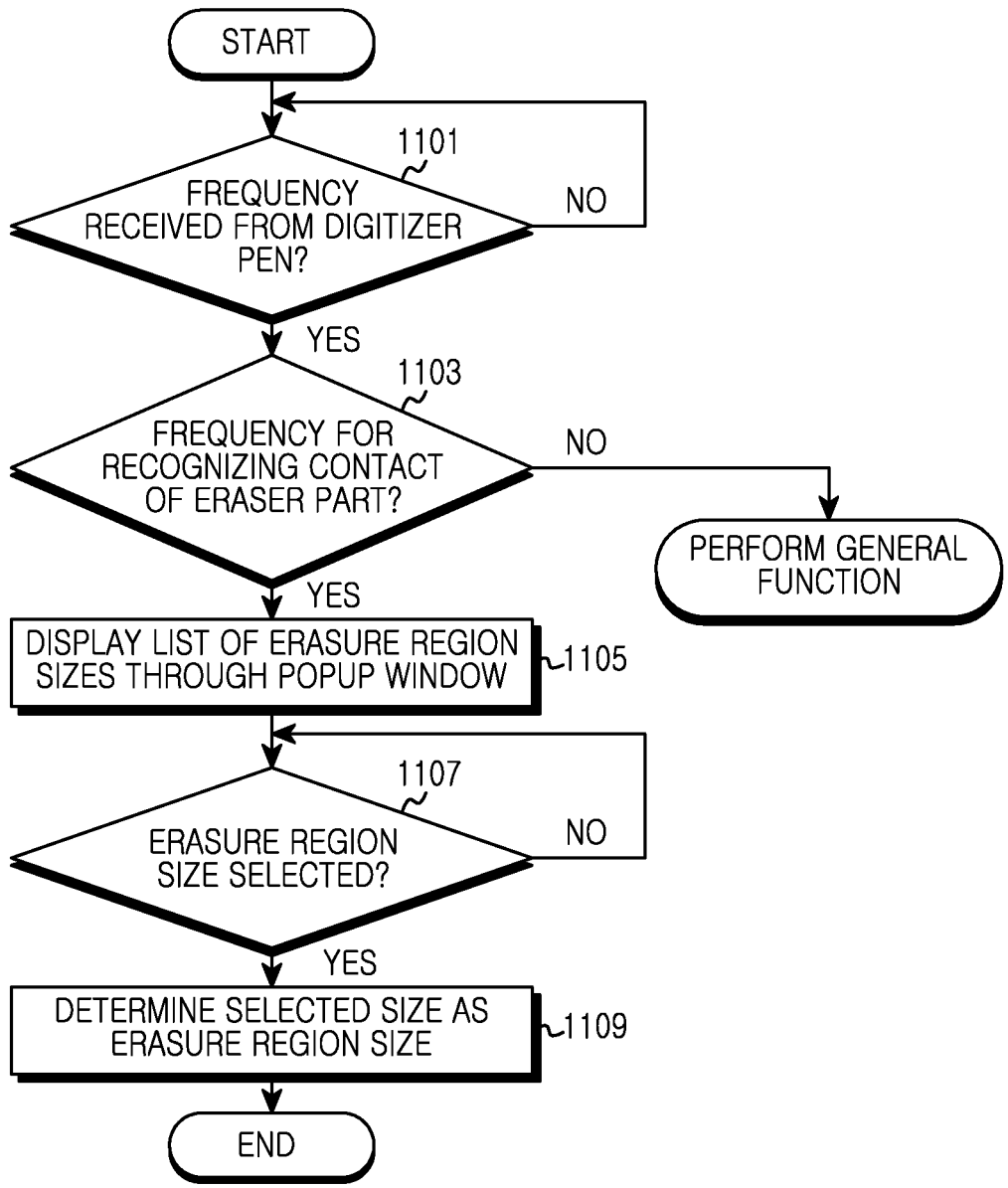
FIG. 11 is a flowchart illustrating an operation method of determining an erasure region size that is dependent on a popup window display in a reception device according to a third exemplary embodiment of the present invention.

FIG. 11 is a flowchart illustrating an operation method for determining an erasure region size using a popup window display in a reception device according to a third exemplary embodiment of the present invention.

Referring to FIG. 11, in step 1101, the reception device determines if a frequency is received from a digitizer pen.

When it is determined in step 1101 that the frequency is received from the digitizer pen, in step 1103, the reception device determines if the received frequency corresponds to a frequency for recognizing a contact of an eraser part.

When it is determined in step 1103 that the received frequency corresponds to the frequency for recognizing the contact of the eraser part, in step 1105, the reception device displays a list of erasure region sizes through a popup window in a void space around a contact recognized region. For example, the reception device can display the list of erasure region sizes through the popup window as in FIG. 9.

In step 1107, the reception device determines if one erasure region size is selected from the list of erasure region sizes displayed through the popup window.

When it is determined in step 1107 that the one erasure region size is selected from the list of erasure region sizes displayed through the popup window, in step 1109, the reception device determines the selected size as an erasure region size of the eraser part. Accordingly, a user can select and use a desired size of an erasure region.

In contrast, when it is determined in step 1103 that the received frequency does not correspond to the frequency for recognizing the contact of the eraser part, the reception device determines that the received frequency corresponds to a frequency for recognizing a contact of a pen part, and performs a general function according to the recognition of the contact of the pen part of the digitizer pen.

In an alternate embodiment, when it is determined in step 1103 that the received frequency corresponds to the frequency for recognizing the contact of the eraser part, the reception device can forward a coordinate of a contact recognized region and a contact recognition indicator indicating that the contact is recognized in the corresponding coordinate, to a separate device without needing to perform steps 1105, 1107, and 1109. Here, the separate device has a display screen, and can wireless or wired connect with the reception device and display, on the display screen, a motion/writing/erasure of the digitizer pen contact recognized by a user on the reception device. In this case, the separate device can display a list of erasure region sizes through a popup window in a void space around a contact recognized region and, according to this, if one erasure region size is selected from the list of erasure region sizes, determine the selected size as an erasure region size of the eraser part.

Thereafter, the reception device terminates the algorithm according to the present invention.

As described above, unlike the conventional eraser function fixed to a preset basic erasure region size, exemplary embodiments of the present invention have an advantage of being capable of adjusting, in real-time, an erasure region size and using an eraser function in a desired erasure region size, by determining an erasure region size depending on a pressure/contact area of an eraser part of a digitizer pen in a digitizer system. If a user desires a larger eraser during operation, the user can simply exert more pressure or increase the amount of contact exerted by the eraser part on the display device. Also, the exemplary embodiments of the present invention have an advantage of making intuitive eraser use possible by forming an eraser part of a digitizer pen in an oblique structure and allowing a user to intuitively recognize a thin eraser and a thick eraser.

Note that the above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method in a digitizer pen, comprising:
   detecting a pressure applied by an eraser part of the digitizer pen when contacting a surface of a remote device;
   detecting, by a processor of the digitizer pen, a first frequency corresponding to the detected pressure based on a pressure-frequency table stored in the digitizer pen; and
   detecting, by the processor, a second frequency corresponding to a contacting portion of the eraser part based on a contacting portion-frequency table stored in the digitizer pen, the contacting portion being at least an edge portion or a surface portion of the eraser part; and
   transmitting the first frequency and the second frequency to the remote device
   wherein the remote device, upon receiving the first frequency and the second frequency, further adjusts in real-time a displayed erasure region size corresponding to the eraser part according to the detected pressure and the detected contacting portion.

2. The method of claim 1, wherein the pressure is detected using a pressure sensor or a variable capacitor coupled to the eraser part of the digitizer pen.

3. The method of claim 1, wherein the contacting portion is detected by an acceleration sensor included in the digitizer pen.

4. A method in a reception device, comprising:
receiving a first frequency transmitted from a digitizer pen and detecting a pressure applied by an eraser part of the digitizer pen on a surface of the reception device based on the received first frequency;
receiving a second frequency transmitted from the digitizer pen and detecting a contacting portion of the eraser part, the contacting portion being at least an edge portion or a surface portion that is oblique relative to a longitudinal axis of the digitizer pen; and
adjusting, in real-time, a displayed erasure region size corresponding to the eraser part according to the detected pressure and the detected contacting portion,
wherein the digitizer pen selects the first frequency and the second frequency for transmission to the reception device based on a pressure-frequency table and a contacting portion-frequency table stored in the digitizer pen.

5. The method of claim 4, further comprising, detecting if the second frequency corresponds to a frequency range indicating contact of the eraser part on the surface.

6. The method of claim 4, wherein the pressure is detected from a second pressure-frequency mapping table stored in the reception device.

7. The method of claim 6, wherein the contacting portion is detected from a second contacting portion-frequency mapping table stored in the reception device.

8. A method in a digitizer pen, comprising:
detecting, by an acceleration sensor of the digitizer pen, a contacting portion of an eraser part of the digitizer pen contacting a surface of a reception device, the contacting portion being at least an edge portion or a surface portion that is oblique relative to a longitudinal axis of the digitizer pen;
detecting a first frequency corresponding to the detected contacting portion based on a contacting portion-frequency table;
detecting, by a pressure sensor of the digitizer pen, a pressure applied by the contacting portion of the digitizer pen to the reception device, and detecting a second frequency corresponding to the detected pressure based on a pressure-frequency table stored in the digitizer pen; and
transmitting the detected first frequency and second frequency to a remote device,
wherein the first frequency and the second frequency correspond to real-time adjustments of the displayed erasure region size based on the detected pressure and the detected contacting portion of the eraser part.

9. A method in a reception device, comprising:
receiving a frequency transmitted from a digitizer pen indicating a pressure applied by an eraser part of the digitizer pen contacting a surface of the reception device; and
adjusting, in real-time, a displayed erasure region size according to the frequency,
wherein the digitizer pen selects the frequency for transmission to the reception device based on a pressure-frequency table stored in the digitizer pen, and
wherein upon receiving the frequency, the reception device further adjusts in real-time a displayed erasure region size corresponding to the eraser part according to the detected pressure and a contacting portion of the digitizer pen.

10. A method in a reception device, comprising:
receiving a frequency transmitted from a digitizer pen indicative of a pressure of the digitizer pen applied against a surface of the reception device;
detect the pressure by referencing the received frequency to a pressure-frequency table stored in the reception device; and
adjust, in real-time, a displayed erasure region size according to the detected pressure,
wherein the digitizer pen selects the frequency for transmission to the reception device based on assignments of frequencies to portions of the digitizer pen stored in the digitizer pen.

11. A digitizer pen, comprising:
a pressure sensor configured to detect a pressure of an eraser part of the digitizer pen applied to a surface of a reception device;
an acceleration sensor configured to detect a contacting portion of the eraser part, the contacting portion being an edge portion or a surface portion of the eraser part; and
a processor configured to:
detect a first frequency corresponding to the pressure based on a pressure-frequency table stored in the digitizer pen,
detect a second frequency corresponding to the contacting portion based on a contacting portion-frequency stored in the digitizer pen, and
transmit, by a transmitter, the first frequency and second frequency to a reception device,
wherein the remote device, upon receiving the first frequency and the second frequency, further adjusts in real-time a displayed erasure region size corresponding to the eraser part according to the detected pressure and the detected contacting portion.

12. A reception device, comprising:
a memory storing a pressure-frequency table and a contacting portion-frequency table;
a receiver configured to receive a first frequency and a second frequency from a digitizer pen; and
a processor configured to:
detect, based on the first frequency and the pressure-frequency table, a pressure by an eraser part of the digitizer pen applied to a surface of the reception device, and
detect, based on the second frequency and the contacting portion-frequency table, a contacting portion of the eraser part contacting the surface, the contacting portion being an edge portion or a surface portion of the eraser part, and
adjust, in real-time, a displayed erasure region size of the eraser part according to the detected pressure and the detected contacting portion,
wherein the digitizer pen selects the first frequency and the second frequency for transmission to the reception device based on a second pressure-frequency table and a second contacting portion-frequency table stored in the digitizer pen.

13. The reception device of claim 12, the processor further configured to:
store an association of frequency ranges to portions of the digitizer pen;
compare the received second frequency to the frequency ranges; and
detect that the eraser part is contacting the surface when the received second frequency matches a frequency range of the association indicating contacting of the eraser part.

14. A digitizer pen, comprising:
a memory configured to store a pressure-frequency table;
an pressure sensor configured to detect a pressure of an eraser part of the digitizer pen applied to a surface of a remote device the;
a processor configured to detect a frequency associated with the pressure based on an association stored in the pressure-frequency table; and
a transmitter configured to transmit the detected frequency to the remote device,
wherein the remote device, upon receiving the frequency, further adjusts in real-time a displayed erasure region size corresponding to the eraser part accord to the detected pressure and a contacting portion of the digitizer pen.

15. A reception device, comprising:
a memory configured to store a pressure-frequency table;
a receiver configured to receive a frequency transmitted from a digitizer pen; and
a processor, configured to:
  detect, by referencing the received frequency to the pressure-frequency table, a pressure of an eraser part of the digitizer pen applied to a surface of the reception device and
  adjust, in real-time, a displayed erasure region size according to the detected pressure,
wherein the digitizer pen selects the frequency for transmission to the reception device based on a pressure-frequency table stored in the digitizer pen.

16. A reception device, comprising:
a display unit;
a memory configured to store an association of frequency ranges with portions of a digitizer pen and a pressure-frequency table;
a receiver configured to receive a first frequency and second frequency transmitted from a digitizer pen; and
a processor, configured to:
  detect whether the received first frequency corresponds to a frequency range of the association indicating a contacting portion of an eraser part of the digitizer pen on the display unit, the contacting portion being an edge portion or a surface portion of the eraser part,
  when the first frequency corresponds to the frequency range, display a list of erasure region sizes through a popup window on the display unit,
  when one erasure region size is selected from the list of erasure region sizes, activate the selected erasure region size, and
  detect, based on the second frequency and the pressure-frequency table, a pressure applied by the eraser part to a surface of the reception device and adjust the activated selected erasure region size according to the detected pressure,
wherein the digitizer pen selects the first frequency and second frequency for transmission to the reception device based on a contacting portion-frequency table and a pressure-frequency table stored in the digitizer pen respectively.

17. The method of claim 1, wherein:
in the contacting portion-frequency table, a smallest contacting portion is associated with a largest erasure region size, and a largest contacting portion is associated with a smallest erasure region size.

18. The method of claim 4, further comprising:
wherein in the contacting portion-frequency table, a smallest contact portion is associated with a largest erasure region size, and a largest contact portion is associated with a smallest erasure region size.

* * * * *

UNITED STATES PATENT AND TRADEMARK OFFICE
CERTIFICATE OF CORRECTION

PATENT NO.         : 9,116,557 B2
APPLICATION NO.    : 13/236944
DATED              : August 25, 2015
INVENTOR(S)        : Jong-Min Lee et al.

It is certified that error appears in the above-identified patent and that said Letters Patent is hereby corrected as shown below:

Claims

Column 10, Claim 1, Lines 59-60 should read as follows:
--...the remote device, wherein...--

Column 10, Claim 1, Line 60 should read as follows:
--...wherein, the remote device...--

Column 10, Claim 1, Line 61 should read as follows:
--...frequency, further adjusting in...--

Column 13, Claim 14, Line 3 should read as follows:
--...a pressure sensor configured...--

Column 13, Claim 14, Lines 5-6 should read as follows:
--...remote device; a processor...--

Column 13, Claim 14, Line 13 should read as follows:
--...eraser part according to...--

Column 13, Claim 15, Lines 24-25 should read as follows:
--...device, and adjust, in...--

Signed and Sealed this
Twenty-second Day of December, 2015

Michelle K. Lee
*Director of the United States Patent and Trademark Office*